(12) United States Patent
Thompson et al.

(10) Patent No.: US 6,584,258 B2
(45) Date of Patent: Jun. 24, 2003

(54) OPTICAL FIBER RIBBON PEEL TOOL

(75) Inventors: Justin Thompson, Huntersville, NC (US); Kevin Duncan, Newton, NC (US)

(73) Assignee: Nexans, Paris (FR)

( * ) Notice: Subject to any disclaimer, the term of this patent is extended or adjusted under 35 U.S.C. 154(b) by 40 days.

(21) Appl. No.: 09/835,385

(22) Filed: Apr. 17, 2001

(65) Prior Publication Data

US 2002/0150361 A1 Oct. 17, 2002

(51) Int. Cl.[7] .................................................. G02B 6/44
(52) U.S. Cl. ..................................................... 385/114
(58) Field of Search ................................ 385/114, 134, 385/136; 156/344, 584

(56) References Cited

U.S. PATENT DOCUMENTS

| | | | |
|---|---|---|---|
| 5,333,233 A | * | 7/1994 | Mansfield et al. ........... 385/134 |
| 5,460,683 A | | 10/1995 | Beasley, Jr. et al. |
| 5,600,750 A | | 2/1997 | Beasley, Jr. et al. |
| 5,643,393 A | | 7/1997 | Genovese et al. |
| 5,795,428 A | | 8/1998 | Beasley, Jr. et al. |
| 5,830,306 A | | 11/1998 | Hinson, II |
| 6,035,088 A | * | 3/2000 | Chandraiah et al. ........ 385/114 |
| 6,091,875 A | * | 7/2000 | Lindsay et al. ............. 385/134 |
| 6,171,177 B1 | * | 1/2001 | Fitz ............................. 451/59 |

OTHER PUBLICATIONS

UV Color Coatings and Matrix Material Design for Enhanced Fiber Optic Ribbon Products, International Wire & Cable Symposium Proceedings, 1997, pp. 274–280; Kariofilis Konstadinidis, et al.

* cited by examiner

Primary Examiner—Robert H. Kim
Assistant Examiner—Thomas R Artman
(74) Attorney, Agent, or Firm—Sughrue Mion, PLLC

(57) ABSTRACT

The present invention is an improved method and apparatus for peeling matrix material from a fiber optic ribbon structure. The present invention uses a peel tool which has a base portion and a lever portion, where the two portions are connected to each other such that they pivot with respect to each other. Both portions are wide enough to allow a fiber optic ribbon to be adhered to opposing surfaces of the lever and base portions when the portions are closed. The ribbon is secured to the opposing surfaces with an adhesive, such that when the lever portion is pivoted away from the base portion an even peel force is distributed across the width of the ribbon matrix, causing an even portion of the ribbon matrix material to be removed, thus exposing the individual fibers for splicing, repair etc. without requiring multiple peel operations.

13 Claims, 5 Drawing Sheets

OPTICAL FIBER RIBBON PEEL TOOL

BACKGROUND OF THE INVENTION

1. Field of the Invention

The present invention generally relates to the field of optical fibers, in particular the present invention relates to an improved device and method for peeling the matrix material from fiber optic ribbons at either the end of a ribbon, or for midspan entry of the ribbon.

2. Discussion of Related Art

In the field of fiber optics the use of fiber optic ribbons has become increasingly popular. An optical fiber ribbon is a collection of optical fibers, usually in the range of 2–48 individual optical fibers, arranged such that the fibers are laid next to each other in the same plane, where the fibers are substantially parallel to each other. This is in contrast to using individual fibers loosely in a optical fiber network. The fibers are all secured to each other through a common ribbon matrix, which is usually a synthetic resin cured over the fibers.

The use of optical fiber ribbons allows for an increase in fiber packing density within a given space. This is extremely advantageous as higher packing densities allow for more fiber to be placed in a given diameter cable and thus more efficient use of existing cable ducts. Further, the use of fiber optic ribbons provide easier fiber identification, maintenance and splicing when working on the fibers. As the advantages of using fiber optic ribbons becomes more widely accepted, ribbon sizes are increasing. This is particularly true with the advent of splittable ribbon units.

A typical fiber optic splittable ribbon unit 10 is shown in FIG. 1, where two or more individual fiber ribbons 11, 12 (for example having twelve fibers 14 each) are joined together with a common matrix material 13 during the manufacturing process to create a wider ribbon (twenty-four fibers). This use of these splittable fiber units allows a single twenty-four fiber ribbon (for example) to be split into two equal twelve fiber portions without compromising the remaining matrix material around the individual twelve fiber ribbons.

However, the use of wider ribbons, or splittable ribbon units, is not without its disadvantages. When installing, repairing or maintaining a fiber optic network there is, on occasion, a need to splice the individual fibers, or otherwise expose the individual fibers. This can be done at either an end of a fiber ribbon, for splicing the fibers to another ribbon or for securing the fibers to a transmission/receiving unit, or along the length of the ribbon (not at an end), to break out only a few of the fibers.

To do these operations it is required to "peel back" or otherwise remove the ribbon matrix material which secures all of the fibers together and holds them in the ribbon form. In the prior art there are many methods to do this, such as manual stripping, chemical stripping, or adhesive stripping. Adhesive stripping is where the ribbon is secured to an adhesive tape or liquid adhesive, which is placed on a flat peel board, and the ribbon is pulled away from the adhesive and peel board, thus causing a portion of the matrix material to remain on the adhesive and board, thereby exposing the individual fibers for access. A typical example of this ribbon peeling process is shown in U.S. Pat. No. 5,460,683 to Beasley, Jr. et al., which is incorporated herein by reference.

The prior-art methods described above have the drawback of creating an angle in the centerline of the fibers contained within the ribbon which is translated into signal attenuation if any of these fibers are live (carrying a signal) at the time of access. Although these methods are acceptable when the ribbon is of a relatively small width, or is not a splittable ribbon unit (having more than one ribbons connected to each other), when the ribbon is wide, the above methods have several drawbacks in addition to the bend angle induced in the fiber. This is particularly true with the adhesion method of peeling a ribbon. This is because of the tendency of the individual performing the peel to favor one side or the other, thereby creating an uneven peel force distribution across the width of the ribbon. For example, if the individual who is peeling the ribbon twists his/her wrist to one side or the other, the ribbon will be subjected to a difference in peel force across its width. Although this also exists in smaller width ribbons, it's impact is less than on wider ribbons. In the wider ribbons or splittable ribbon units, an inconsistent peel force can cause problems such as one ribbon of the ribbon unit peeling and another not peeling. This introduces the need for the peel operation to be performed multiple times, greatly decreasing the efficiency of the installation, splicing, etc. of optical ribbons.

SUMMARY OF THE INVENTION

The present invention is intended to cure the problems, stated above, with peeling the matrix material off of wider ribbons and splittable ribbon units. This is accomplished by using a peel tool which is a lever device for guiding the peel process to ensure that the peel force is distributed evenly across the entire width of the ribbon to be peeled. The even distribution of the peel force greatly increases the probability of an even peel. It should be noted that the present invention is not intended to completely replace the use of the peel board, but may be used with a peel board, as will be described in more detail below. Additionally, the tool may be operated such that the centerline of the fibers is stationary and the peel board to which the coating (matrix) is adhered is pulled away. This will allow the same peeling process to take place with reduced mechanical stress applied to the fibers.

The present invention is of a lever arm design where the prior art peel board or just the ribbon itself may be placed in the base and/or lever arm of the device, and a ribbon is glued or otherwise adhered to the peel board or base, and to a lever arm on the device. Therefore the ribbon will be adhered to two different opposing surfaces. The lever arm is then lifted away from the peel board or base causing the matrix coating to peel away from the ribbon fibers and thus exposing the fibers. In a preferred embodiment the tool would possess the ability to lightly clamp the ribbon into place on the base side so that the fibers remain on the base without any bend induced by the peeling process. The coating on the face of the ribbon facing the base side of the tool may, or may not be adhered to an adhesive surface on the base. By lifting the lever arm portion, to which one side of the ribbon coating is adhered (but the fibers are not clamped to), the coating on this side can be pulled away from the fibers.

The tool of the present invention can be made in almost any size, it can be made to accommodate existing peel boards, it can be made smaller so as to be easily mobile, it can be made to be used without a peel board so as to be disposable after a single use for emergency repair kits, etc, or it can be made without a peel board so that an adhesive is applied to the surfaces of the tool itself and is removed after use to clean the tool for reuse.

The present invention will allow wider ribbons, particularly splittable ribbon units, to be peeled in a single step, whereas prior art methods require multiple steps because of the uneven peel forces applied. The present invention will also allow for reduced risk of fiber damage and/or temporary attenuation increases introduced by the bending of fibers required in the prior art methods.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION OF THE INVENTION

The present invention will be explained in further detail by making reference to the accompanying drawings, which do not limit the scope of the invention in any way.

Figure 1:
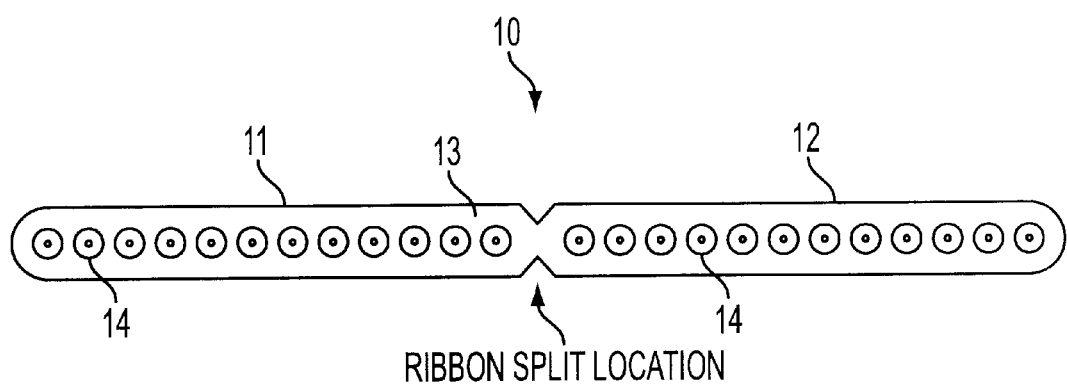
FIG. 1 is a diagrammatical representation of a cross-section of a typical splittable ribbon unit.
Figure 2A:
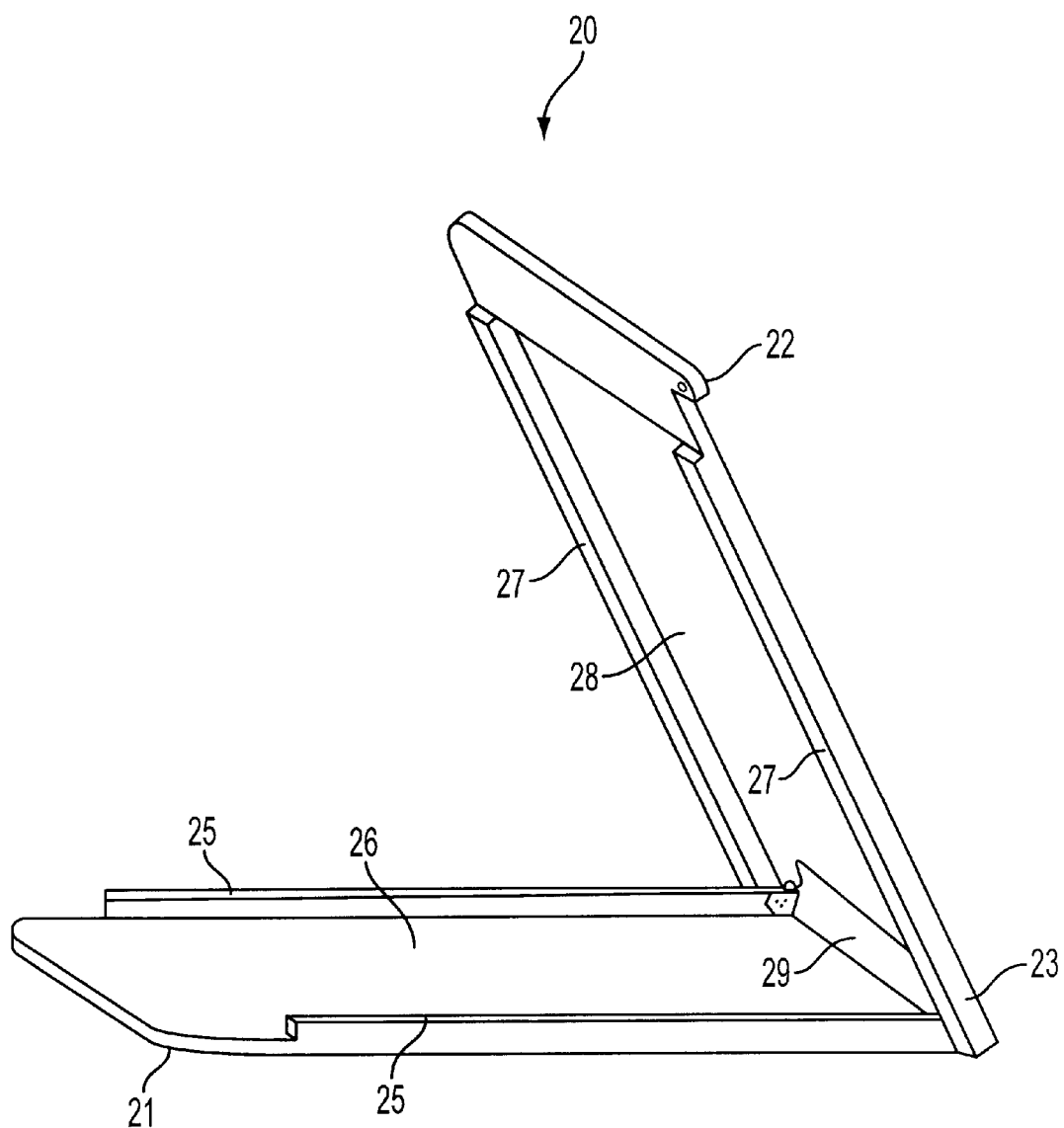
FIG. 2A is a diagrammatical representation of the tool of the present invention, according to one embodiment.

An embodiment of the present invention can be seen in FIG. 2A, where the peel tool 20 of the present invention includes a base portion 21 which is connected to a lever portion 22 at a hinge or pivot point 23. Although it is not necessary to the present invention, the base portion 21 and lever portion 22 are shown as "U" channels having vertical sections 25, 27, respectively, on each side of the ribbons beds 26, 28, respectively. This "U" channel configuration allows the peel board or ribbon to be stabilized in the tool. It is desirable for the beds 26 and 28 to be substantially flat to ensure an even peel is obtained. However, as previously noted a peel board (not shown) may be used with the present invention, by securing the peel board to the bed(s) in the base and/or lever arm. If the peel board is used in this manner it is not necessary for the bed(s) 26 and/or 28 to be substantially flat as the ribbon will be adhered to the peel board and not the bed 26 and/or 28. Any typical prior art peel board may be used. An example of a peel board that can be used with the present invention is shown in U.S. Pat. No. 5,830,306 to Hinson, II, which is incorporated herein by reference.

The peel board (not shown) can be secured to the tool by any commonly known or used method, including but not limited to, the use of the same adhesive used to secure the ribbon to the tool.

The lever portion 22 can be secured to the base portion 21 by any common or known method, allowing the two portions to be secured to each other, but yet allowing the two portions to pivot with respect to each other. The hinge or pivot portion 23 can be a hinge, screws, pins, or molded engagement portions in either the base portion or lever portion which engage with engagement receptacles in the other portion. It should be noted that although the exact configuration of the attachment between the lever portion 22 and the base portion 21 is not critical it should create a gap or space 29 between the two portions to allow the portion of the ribbon that is not be peeled to exit from the peel tool 20 through this hinge or pivot section 23.

Figure 2B:
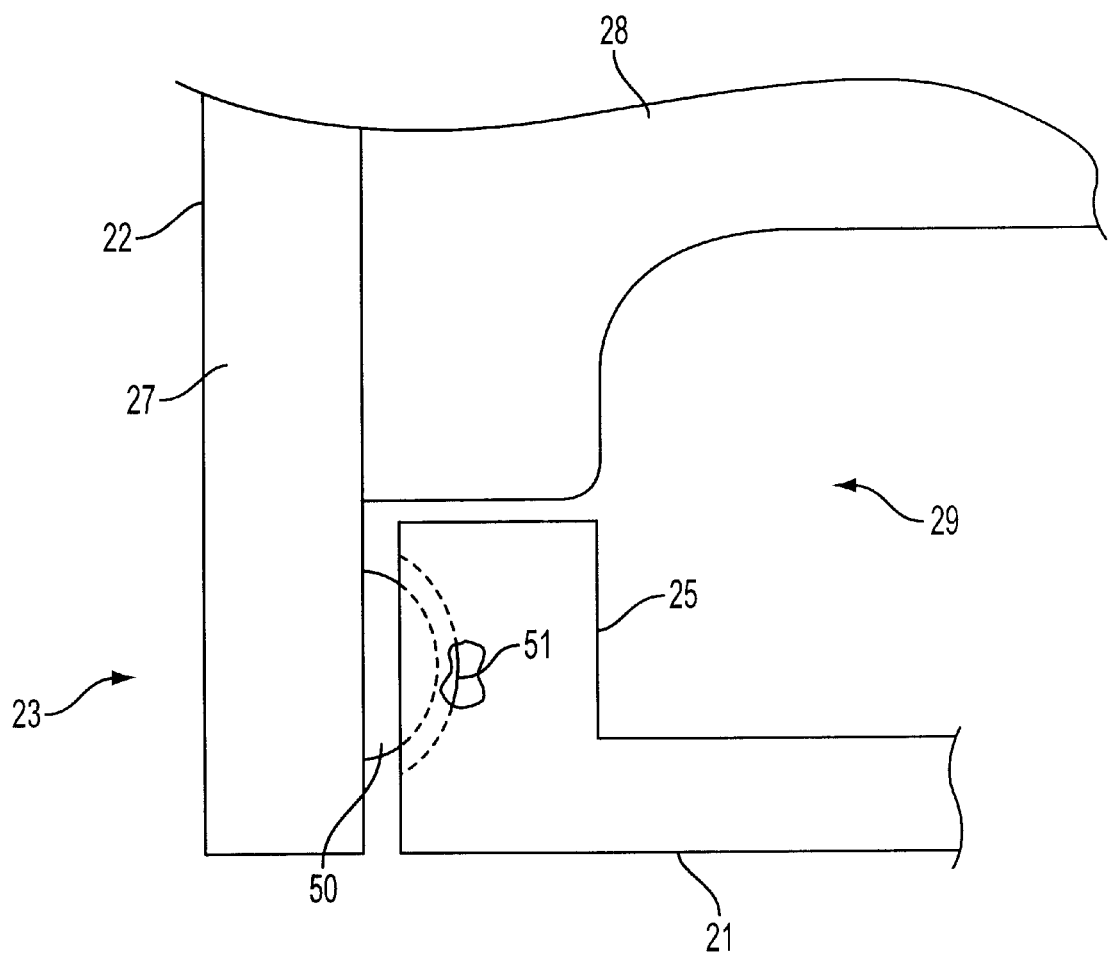
FIG. 2B is a diagrammatical representation of one embodiment of an engagement mechanism between the base portion and lever portion of the present invention.

It should also be noted that it would be desirable to have the lever portion 22 removably engaged with the base portion 21 so that the peel tool 20 can be placed on a ribbon in midspan of the ribbon. If the two portions could not be removed from each other an operator would have to place the tool 20 over the end of the ribbon and slide it to wherever the peel operation is to be performed. The removable engagement at the hinge portion 23 can be accomplished by any commonly known or standard means of removable engaging two pivoting or hinging pieces. For example, as shown in FIG. 2B the lever portion can have integrally molded projections 50 which removably engage with integrally molded receptacle sections 51 in the base portion, such that the lever portion 22 can be repeatedly removed and reattached to the base portion allowing easy midspan positioning.

Figure 5:
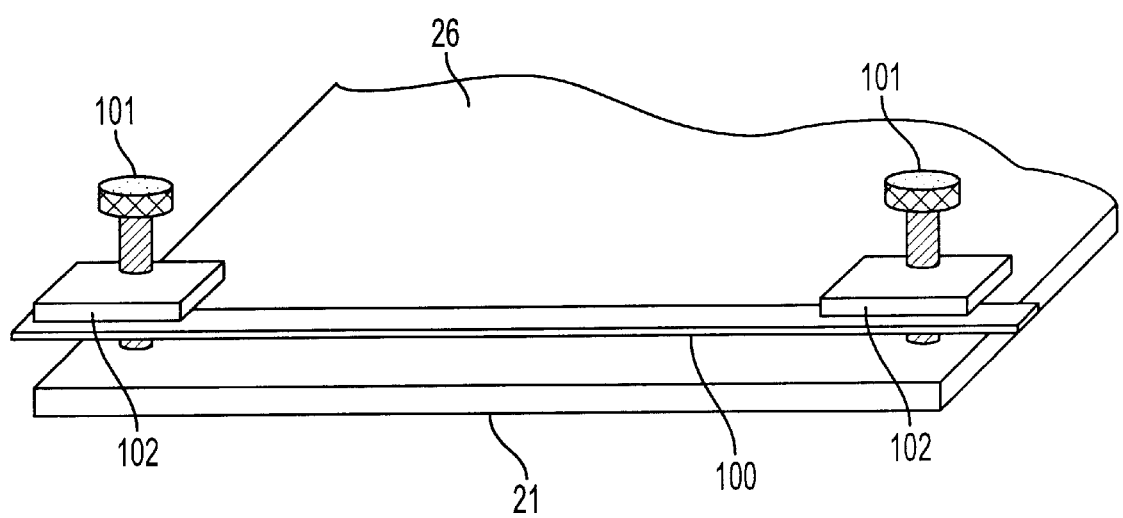
FIG. 5 is a diagrammatical representation of a clamping mechanism to clamp the optical fiber ribbon during peeling.

Additionally, in the preferred embodiment the tool would possess the ability to lightly clamp the ribbon into place on the base side so that the fibers remain on the base without any bend induced by the peeling process. The coating on the face of the ribbon facing the base side of the tool may, or may not be adhered to an adhesive surface on the base. By lifting the lever arm portion, to which one side of the ribbon coating is adhered (but the fibers are not clamped to), the coating on this side can be pulled away from the fibers, without creating excessive bending stresses in the individual fibers. A preferred method to clamp the ribbon is shown in FIG. 5. The clamping mechanism shown includes a plate 100 which is secured to the base portion 21 (or alternatively the lever portion, or to any other structure which would allow for adequately clamping the ribbon) with fasteners 101 such as thumb screws (shown), bolts, regular screws, clamps, spring clamps, or any other fastener which can hold the plate 100 in contact with a ribbon. Further, shown in FIG. 5 are flat washer portions 102 which, although are beneficial to protect the plate 100, are not necessary. In the preferred embodiment of the clamping structure, the plate 100 should be covered with a foam, or rubber, or any other cushioning material to cushion the fibers/ribbon while the clamp plate 100 is gripping the fibers/ribbon.

It is noted that in addition to the above clamping mechanism, any commonly known or used method to clamp a ribbon may be utilized, including but not limited to: spring clamps, adjustable pressure spring clamps, hold down toggle clamps (vertical and horizontal), etc. It should be noted that if these methods are used they should also be cushioned to prevent pressure damage to the fibers in the ribbon. Further, another embodiment is similar to that shown in FIG. 5, except the panel 100 is broken into two panels, each secured by a fastener, where the plate portions are long enough to secure the ribbon to the base portion 21.

Further, it should be noted that the peel tool 20 and each of it's portions 21, 22 can be made of any commonly known rigid or semi-rigid material. For example, the tool 20 can be made of plastic, hard rubber, metal, graphite composite, or any other material suitable to be used in conjunction with the peel of fiber optic ribbons. Preferably the tool could be made from either aluminum or stainless steel. An aluminum construction allows the tool to be lightweight and durable, while a stainless steel construction allows the tool to be easier to clean and more durable than the aluminum construction.

Therefore, the material to be chosen depends on the overall attributes desired.

Figure 3:
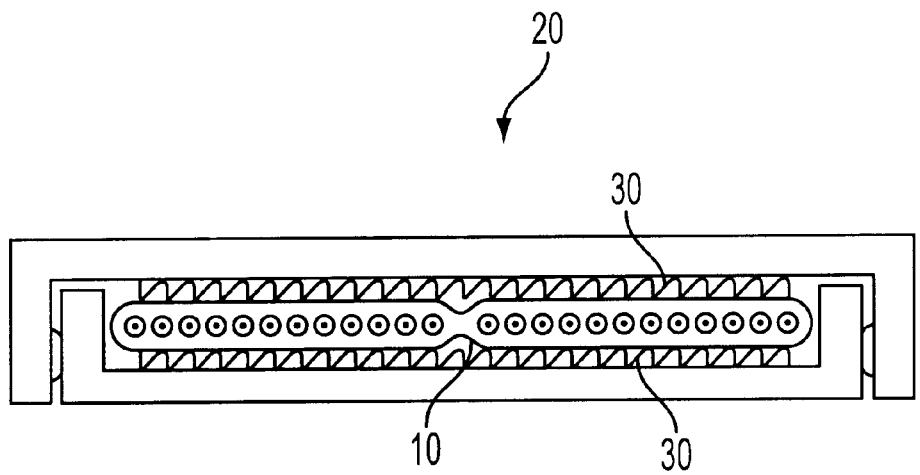
FIG. 3 is a diagrammatical representation of the tool of the present invention shown in the closed position with a splittable ribbon unit adhered to both the lever and the base.
Figure 4:
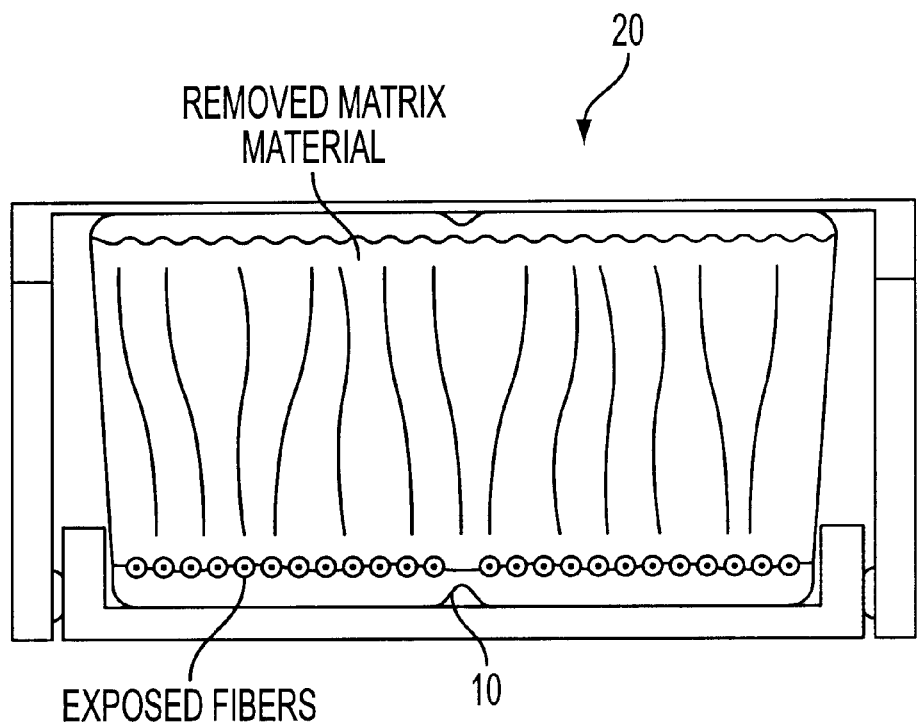
FIG. 4 is a diagrammatical representation of the tool of the present invention shown in an open position where some of the matrix material of the ribbon is pulled way on the lever portion of the tool.

A method of practicing the invention will now be described with reference to FIGS. 3 and 4. In FIG. 3, the peel tool 20 of the present invention is shown in the closed position, where the ribbon unit 10 is secured by an adhesive 30 to both the lever portion 22 and the base portion 21 (or a peel board not shown). FIG. 4 depicts the same ribbon 10 and peel tool 20 except that the peel tool 20 is now in an open position, showing that a portion of the matrix material of the ribbon 10 is remaining on the lever portion 22 as it is pivoted or pulled away from the base portion, to which the individual fibers and remaining matrix material are still secured. This will allow exposure of the individual fibers for splicing or whatever operation is to be performed.

Initially, the location at which the operation (i.e. splicing, etc.) to occur on the ribbon is to be determined. Then the tool 20 is placed at the proper position along the ribbon. Depending on the configuration of the tool, a peel board may or may not be used. In the present example, a peel board is not used between the ribbon 10 and the base portion 21. Instead the ribbon is secured to the bed 26 of the base portion 21 with an adhesive 30. The adhesive can be any standard or commonly used adhesive used for this process, including adhesive tape or cyanoacrylate adhesive (glue) as is described in U.S. Pat. No. 5,460,683. The adhesive 30 is then placed on either the top of the ribbon or the face of the lever portion 22, and the lever portion 22 is closed onto the ribbon 10, thus securing the ribbon 10 to both the base portion 21 and the lever portion 22. After the adhesive is allowed to set the required time (depending on the adhesive used), the lever portion is pulled (pivoted) away from the base portion, thus causing a portion of the matrix material to be pulled away from the fibers in the ribbon. This exposes the individual fibers of the ribbon for access. The fibers can than be spliced or inspected as normally done in the art.

It should be noted that the above process, and FIGS. 3 and 4, do not reference lightly clamping the ribbon and fibers to the base portion (or peel board) as would be preferred, however, this step may be accomplished prior to the peeling of the ribbon by any commonly known or suitable means, so as to not crush or otherwise cause attenuation in the fibers.

It is of course understood that departures can be made from the preferred embodiments of the invention by those of ordinary skill in the art without departing from the spirit and scope of the invention that is limited only by the following claims.

We claim:

1. A method of peeling fiber optic ribbon matrix material; comprising:

locating a peel location on a fiber optic ribbon;

placing a fiber optic peel tool at said location, said peel tool comprising a base portion and a lever portion movably engaged with said base portion;

securing said fiber optic ribbon to said base portion;

securing said fiber optic ribbon to said lever portion; and moving said lever portion away from said base portion to at least partially remove a matrix material from said fiber optic ribbon.

2. The method of peeling a fiber optic ribbon according to claim 1, wherein said base portion and said lever portion are pivotally engaged with each other.

3. The method of peeling a fiber optic ribbon according to claim 1, wherein an adhesive or adhesive tape is used in said securing steps.

4. The method of peeling a fiber optic ribbon according to claim 1, wherein at least one of said base portion and said lever portion are made from metal.

5. The method of peeling a fiber optic ribbon according to claim 1, wherein during said moving step the lever portion and base portion are moved such that a centerline of said fiber optic ribbon is kept stationary.

6. The method of peeling a fiber optic ribbon according to claim 1, further comprising clamping said ribbon to one of said lever portion or said base portion prior to said moving step.

7. A method of peeling fiber optic ribbon matrix material; comprising:

locating a peel location on a fiber optic ribbon;

placing a fiber optic peel tool at said location, said peel tool comprising a base portion and a lever portion movably engaged with said base portion;

positioning a peel board between said fiber optic ribbon and said base portion;

securing said fiber optic ribbon to said peel board;

securing said fiber optic ribbon to said lever portion; and moving said lever portion away from said peel board to at least partially remove a matrix material from said fiber optic ribbon.

8. The method of peeling a fiber optic ribbon according to claim 7, wherein said base portion and said lever portion are pivotally engaged with each other.

9. The method of peeling a fiber optic ribbon according to claim 7, wherein an adhesive or adhesive tape is used in said securing steps.

10. The method of peeling a fiber optic ribbon according to claim 7, wherein at least one of said base portion and said lever portion are made from metal.

11. The method of peeling a fiber optic ribbon according to claim 7, further comprising securing said peel board to said base portion prior to moving said lever portion away from said peel board to at least partially remove a matrix material from said fiber optic ribbon.

12. The method of peeling a fiber optic ribbon according to claim 7, wherein during said moving step the lever portion and the peel board are moved such that a centerline of said fiber optic ribbon is kept stationary.

13. The method of peeling a fiber optic ribbon according to claim 7, further comprising clamping said ribbon to one of said lever portion or said peel board prior to said moving step.

* * * * *